US012594515B2

(12) United States Patent
Zhang et al.

(10) Patent No.: US 12,594,515 B2
(45) Date of Patent: Apr. 7, 2026

(54) PARTICULATE FILTER

(71) Applicant: BASF MOBILE EMISSIONS CATALYSTS LLC, Iselin, NJ (US)

(72) Inventors: Jia Di Zhang, Shanghai (CN); Teng Shen, Shanghai (CN); Jian Li, Shanghai (CN); Wen Ji Song, Shanghai (CN); Tobias Paul, Hannover (DE); Martin Kalwei, Hannover (DE); Edgar Viktor Huennekes, Hannover (DE); Weiyong Tang, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 82 days.

(21) Appl. No.: 18/269,117

(22) PCT Filed: Dec. 1, 2021

(86) PCT No.: PCT/US2021/061330

§ 371 (c)(1),
(2) Date: Jun. 22, 2023

(87) PCT Pub. No.: WO2022/140024

PCT Pub. Date: Jun. 30, 2022

(65) Prior Publication Data

US 2024/0082765 A1     Mar. 14, 2024

(51) Int. Cl.
*B01D 39/20*     (2006.01)

(52) U.S. Cl.
CPC .... *B01D 39/2058* (2013.01); *B01D 2255/702* (2013.01); *B01D 2258/01* (2013.01)

(58) Field of Classification Search
CPC .......... B01D 39/2058; B01D 2255/702; B01D 2258/01; B01D 39/2068; B01D 53/944; B01D 2239/0471; B01D 2239/1216; B01D 2239/1241; B01D 2255/1021; B01D 2255/912; B01D 2255/9155; B01D 53/92; B01D 39/2072; B01D 46/80; B01D 2255/915; F01N 3/0237; F01N 3/035; F01N 3/0222; F01N 3/2066; F01N 9/002; F01N 2550/04; F01N 2900/102; F01N 2900/1411; F01N 3/0224; Y02T 10/40

See application file for complete search history.

(56) References Cited

U.S. PATENT DOCUMENTS

| | | | |
|---|---|---|---|
| 2004/0045439 A1* | 3/2004 | Zilliox | F01N 3/023 96/233 |
| 2006/0016340 A1* | 1/2006 | Braeunling | B01D 39/1623 96/134 |
| 2006/0070359 A1* | 4/2006 | Sellers | F01N 3/023 55/303 |
| 2007/0266701 A1* | 11/2007 | Cheng | F01N 3/035 60/295 |

(Continued)

OTHER PUBLICATIONS

International Search Report and Written Opinion from corresponding PCT International Patent Application No. PCT/US2021/061330 dated Feb. 15, 2022.

*Primary Examiner* — Brandon D Lee
(74) *Attorney, Agent, or Firm* — DLA Piper LLP (US)

(57) ABSTRACT

The present invention provides a method for treating a used particulate filter, comprising: removing particulates from the particulate filter; and introducing simulated ash into inlet channels of the particulate filter after removing the particulates.

15 Claims, 4 Drawing Sheets

(56)             References Cited

U.S. PATENT DOCUMENTS

| | | | |
|---|---|---|---|
| 2012/0009092 A1 | 1/2012 | Mizutani et al. | |
| 2016/0123201 A1* | 5/2016 | Silver | F02B 79/00 |
| | | | 60/297 |
| 2016/0326926 A1 | 11/2016 | Kahlert | |
| 2017/0106322 A1* | 4/2017 | Clayton, Jr. | F01N 3/0232 |
| 2019/0203621 A1 | 7/2019 | Seki et al. | |
| 2020/0025054 A1* | 1/2020 | Barve | B01D 37/046 |
| 2020/0191030 A1* | 6/2020 | Clowes | F01N 3/0222 |
| 2021/0115825 A1* | 4/2021 | Miyairi | B01D 46/42 |
| 2022/0178285 A1* | 6/2022 | Su | F01N 9/002 |

* cited by examiner

PARTICULATE FILTER

CROSS-REFERENCE TO RELATED APPLICATIONS

This application claims the benefit of priority to International Application No. PCT/CN2020/139020, filed Dec. 24, 2020 in its entirety.

TECHNICAL FIELD

The present disclosure relates generally to a particulate filter for cleaning particulate matters from sources including but not limited to engine emission and, more particularly, to a method and system for treating a particulate filter during manufacture and/or maintenance of the particulate filter.

BACKGROUND

Components of particulate matter (PM) include fine solids or liquids such as dust, fly ash, soot, smoke, aerosols, fumes, mists and condensed vapors that can be suspended in the air for a long time. Particulate matters originate from a variety of stationary and mobile sources and may be directly emitted (primary PM sources) or formed in the atmosphere by transformation of gaseous emissions (secondary PM sources).

Primary PM sources are derived from both human and natural activities. A significant portion of PM sources is generated from a variety of human activities. These types of activities include agricultural operations, industrial processes, combustion of wood and fossil fuels, construction and demolition activities, and entrainment of road dust into the air. Natural (nonanthropogenic or biogenic) sources also contribute to the overall PM problem. These include wind-blown dust and wildfires.

Secondary PM sources directly emit air contaminants into the atmosphere that form or help form PM. Hence, these pollutants are considered precursors to PM formation. These secondary pollutants include SOx, NOx, VOCs and ammonia. Control measures that reduce PM precursor emissions tend to have a beneficial impact on ambient PM levels.

For example, emissions of an internal combustion engine are composed of three phases: solids, liquids and gases. The combined solids and liquids are called particulates, particulate matters (PM) or total particulate matters (TPM), and mainly include dry carbon (soot), inorganic oxides, such as sulfates, or organic liquids.

A particulate filter is known to be used for removing particulate matters generated by, but not limited to, an internal combustion engine such as lean-burn engines, diesel engines, natural gas engines, gasoline engines, power plants, incinerators, or generator sets. It is also known in the art that a particulate filter may take one of the forms of a flow-through filter, wall flow filter (WFF) and more. A commonly known type of the particulate filter is Diesel particulate filter (DPF) which physically captures diesel particulates to prevent their release to the atmosphere. Diesel particulate filter materials have been developed that show impressive filtration efficiencies, as well as good mechanical and thermal durability. Diesel particulate filters have become the most effective technology for the control of diesel particulate emissions.

Due to the particulate deposition mechanisms in these devices, filters are most effective in controlling the solid fraction of diesel particulates, including elemental carbon (soot) and the related black smoke emission. Filters may have limited effectiveness, or be totally ineffective, in controlling non-solid fractions of PM emissions, such as the organic fraction (OF) and sulfate particulates. To control total PM emissions, DPF systems are likely to incorporate additional functional components targeting the organic fraction, typically oxidation catalysts, while ultralow sulfur fuels may be required to control sulfate particulates.

The term "diesel particulate trap" is sometimes used as a synonym for "diesel particulate filter", especially in older literature. The term "trap" covers a wider class of particulate separation devices.

It may be noted that particulate oxidation catalysts (POC), sometimes called partial filters, can also capture diesel particulates, but provide a much lower overall efficiency than diesel particulate filters. In their common designs, POCs capture particulates only from a fraction of the flow. In the case of some filter media, however, the distinction may not be very clear, and the devices can be classified as either a POC or a (depth) particulate filter.

Due to the low bulk density of diesel particulates, which is typically below 0.1 $g/cm^3$, depending on the degree of compactness, diesel particulate filters can quickly accumulate considerable volumes of soot. Substantial amount of soot per day may be collected from an older generation heavy-duty engine. The collected particulates would eventually cause excessively high exhaust gas pressure drop in the filter, which would negatively affect the engine operation. Therefore, diesel particulate filter systems have to provide a way of removing particulates from the filter to restore its soot collection capacity. This removal of particulates, known as the filter regeneration, can be performed either continuously, during regular operation of the filter, or periodically, after a pre-determined quantity of soot has been accumulated. Thermal regeneration of diesel particulate filters is typically employed, where the collected particulates are oxidized by oxygen and/or nitrogen dioxide to gaseous products, primarily to carbon dioxide.

To ensure that particulates are oxidized at a sufficient rate, the filter must operate at a sufficient temperature. In some filter systems, the source of heat is the exhaust gas stream itself. In this type of filter system, referred to as a passive filter, the filter regenerates continuously during the regular operation of the engine. Passive filters usually incorporate some form of catalyst, which lowers the soot oxidation temperature to a level that can be reached by exhaust gases during the operation of the vehicle. Another approach which may be needed to facilitate reliable regeneration involves a number of active strategies for increasing the filter temperature (engine management, fuel combustion in the exhaust system, electric heaters, etc.). Regeneration of such devices, known as active filters or pseudo-active filters, is usually performed periodically, as determined by the vehicle's control system.

An alternative strategy involves the use of disposable filter cartridges, which are replaced with new units once filled with soot. Particulate filters of this kind are used in some occupational health environments.

Gasoline particulate filters (GPF) are an emission after-treatment technology, similar to diesel particulate filters (DPF), developed to control particulate emissions from gasoline engines, especially gasoline direct injection (GDI) engines. The technology is also referred to as petrol particulate filter (PPF) and, in some German literature, as Otto particulate filter (Ottopartikelfilter in German), abbreviated OPF.

GPFs are expected to be used primarily in Europe and in China, to meet the particulate number (PN) emission standards for gasoline passenger cars and light commercial vehicles adopted in both jurisdictions. The Euro 6 regulations set PN (as well as PM) limits for GDI vehicles that are equivalent to those for diesels. The Chinese PN standards are not limited to GDI but applied to all gasoline vehicles.

GPFs may be also adopted for some port fuel injected (PFI) engines, even though PFI vehicles are not subject to European PN/PM emission standards.

Most early GPF applications included an uncoated GPF positioned downstream of a TWC catalyst. As the technology matured, GPFs have been also coated with a three-way catalyst. This catalyst coated GPF configuration is sometimes referred to as the 4-way catalyst (FWC).

While the GPF and DPF technologies are closely related, there are a number of differences in the filter configuration, operation and control strategy, which are due to the differences in the operating conditions, and the particulate emission rates and composition between gasoline and diesel engines.

After a long time of service of the filter, particulate matters will accumulate in the channels of the filter, adversely limiting the filter's service life, increasing its pressure drop and weakening the fuel economy of the engine. Thus, a particulate filter is required to be cleaned regularly so as to remove the particulates accumulated in the channels. Currently, the cleaning of particulate matters is mostly performed at prescribed maintenance intervals or when abnormally high pressure drop in the filter triggers a fault condition. For instance, the minimum particulates cleaning interval established by the US EPA for heavy duty on-highway vehicles is 150,000 miles of driving.

SUMMARY

In one aspect, there is disclosed a method for treating a used particulate filter comprising: removing particulates from the particulate filter; and introducing simulated ash into inlet channels of the particulate filter after removing the particulates.

The method is useful for substantially most types of commercially available filters which aim to remove particulate matters from sources including, but not limited to, an internal combustion engine such as lean-burn engines, diesel engines, natural gas engines, gasoline engines, power plants, incinerators etc.

The filter can be formed as honeycomb wall flow filter, wound or packed fiber filter, open cell foam, sintered metal filter, candle filter, etc., as known in the art. The filter can be a canned filter which includes a filtering monolith contained in a housing or an un-canned filter which include a filtering monolith but does not include a housing for protecting the filtering monolith for instance until being incorporated into an emission treatment system.

The filter is typically formed of a porous substrate. The porous substrate may comprise a ceramic material such as, for example, cordierite, silicon carbide, silicon nitride, zirconia, mullite, spodumene, alumina-silica-magnesia, zirconium silicate, and/or aluminum titanate, typically cordierite, silicon carbide, or any material as known in the art. The filter is advantageously comprising refractory materials such as cordierite, silicon-carbide or aluminum titanate.

The method is useful for treating used filters, that is, the filters have been used in performing their filtering function. For instance, the method may be useful for treating a used filter which satisfies at least one of the following treatment criteria: a specific period of time since the latest treatment of the particulate filter, a specific driving mileage of a vehicle with the particulate filter, frequency of regeneration in a specific period of time of the particulate filter, horsepower of a vehicle with the particulate filter, warning from an indicator light, a signal from a sensor, a specific backpressure of the particulate filter, a specific loading of particulate matters, etc. For instance, the method may be useful for treating a used filter to satisfy more stringent or more enforced regulation.

In the method, the step of removing the particulates preferably includes applying a gas and/or liquid flow at an outlet end and/or an inlet end of the particulate filter.

In one or more embodiments, the gas flow is provided with a pressure of about 1-15 bar and/or with a flow rate of about 100-10000 L/min.

In one or more embodiments, the gas flow comprises, but not limited to, oxygen, or nitrogen, or $CO_2$, or noble gas.

In one or more embodiments, the gas flow comprise steam.

In one or more embodiments, the liquid flow is provided with a pressure of about 0-15 bar and/or with a flow rate of about 0-10000 L/min. In the method, the step of removing the particulates preferably includes exposing the particulate filter to a temperature up to about 450° C. to 850° C.

In the method, the step of introducing simulated ash preferably includes introducing a flow of solid particulates and/or liquid droplets of the simulated ash and/or a precursor of the simulated ash through an inlet end of the particulate filter into channels of the particulate filter. Advantageously, the flow of solid particulates and/or liquid droplets is provided at 100-10000 $m^3$/h. Advantageously, the flow of solid particulates and/or liquid droplets is introduced into the particulate filter via blowing, sucking, spraying and/or coating, etc.

In the method, the step of introducing simulated ash preferably includes introducing simulated ash into channels of the particulate filter and, optionally, further treating the particulate filter. In one embodiment, such treatment comprises exposing the particulate filter to a thermal condition, e.g. no less than 300° C., more preferably no less than 350° C., and most preferably no less than 400° C.

In the method, the step of introducing simulated ash preferably includes introducing a precursor into channels of the particulate filter and further treating the particulate filter to convert the precursor to simulated ash. In one embodiment, such treatment comprises exposing the particulate filter to a thermal condition, e.g. no less than 300° C., more preferably no less than 350° C., and most preferably no less than 400° C.

In the method, the simulated ash and/or precursor is advantageously provided in an amount of no less than about 0.05 gram per liter of the volume of the particulate filter.

In the method, the simulated ash has a porous structure that survives no less than 300° C.

In the method, the simulated ash comprises at least one of a refractory material that is resistant to significant decomposition by heat, pressure, physical or chemical treatment by particulates and other components (such as hydrocarbon, CO, nitrogen oxides, $O_2$, $N_2$, $CO_2$, $H_2O$, etc.) in the exhaust gas or flue gas or feed gas.

In the method, the simulated ash can be introduced to the particulate filter as it is and/or from a precursor.

In one embodiment, the precursor is a material that participates in at least a chemical reaction that produces simulated ash.

In one embodiment, the precursor is a material that participates in at least a physical change that produces simulated ash.

In one embodiment, the precursor is a material that generates simulated ash under treatment conditions. The treatment conditions comprise, but not limited to, temperature such as heating or cooling, light such as photo, microwave, radiation, electric field, magnetic field, electromagnetic field, ultrasound, pressure, mechanical strength.

In one embodiment, such treatment comprises exposing the particulate filter to a thermal condition, e.g. no less than 300°, more preferably no less than 350° C., and most preferably no less than 400° C.

In some embodiments, the simulated ash and/or precursor comprises, but not limited to, one or more of the following: oxygen-containing compound or compounds of oxygen, such as inorganic oxide compound, metal oxide, nonmetal oxide, composite oxide, mixed oxide, salt, sulfate, phosphate, carbonate, silicate, molecular sieve, hydroxide, organometallics, etc.

In some embodiments, the simulated ash and/or precursor comprises aluminum oxide, aluminate, zinc oxide, zinc carbonate, calcium oxide, calcium carbonate, cerium zirconium (mixed) oxide, zirconium oxide, cerium oxide, silica, titania, silicon titanium (mixed) oxide, a rare earth metal oxide other than ceria, magnesium oxide, barium oxide, barium sulfate, barium carbonate, hafnium oxide, manganese oxide, iron oxide, vanadium oxide, niobium oxide, chromium oxide, molybdenum oxide, tungsten oxide, cobalt oxide, nickel oxide, copper oxide, antimony oxide, alkali metal oxide, alkali earth metal oxide, transition metal oxide, main group metal oxide, molecular sieve, silicate zeolite, aluminosilicate zeolite, non-zeolitic molecular sieve.

In some embodiments, the simulated ash and/or precursor are from natural sources, which comprises, but not limited to lime, tephra, refractory clay, fire clay or ceramics.

In some embodiments, the simulated ash and/or precursor are obtained from a treatment or processing of natural sources.

In some embodiments, the simulated ash and/or precursor comprises, but not limited to silicon carbide and carbon (graphite).

In some embodiments, the simulated ash and/or precursor comprises, but not limited to, carbide, nitride, binary compounds such as tungsten carbide, boron nitride, hafnium carbide, ternary compounds such as tantalum hafnium carbide, etc.

In some embodiments, the simulated ash and/or precursor comprises, but not limited to, platinum group metals and noble metals, such as ruthenium (Ru), rhodium (Rh), palladium (Pd), osmium (Os), iridium (Ir), platinum (Pt), gold (Au), copper (Cu), silver (Ag), rhenium (Re), and mercury (Hg).

Advantageously, the simulated ash and/or its precursor preferably have a particulate size ranging from about 0.01 micron to about 1000 micron, and preferably from about 0.1 micron to about 100 micron, and most preferably from about 0.2 micron to about 50 micron.

In another aspect, there is disclosed a system for treating a used particulate filter by the method as disclosed above. That is, each of the features of the above aspect may be freely combined with this aspect which further comprises: a cleaning unit with a gas and/or liquid flow applicator configured to remove particulates accumulated in the particulate filter; an introducing unit configured to provide simulated ash and/or precursor of the simulated ash into channels of the particulate filter after removing the particulates.

In the system, a detection unit is advantageously included for evaluating the particulate filter based on a treatment criterion. For example, the treatment criterion can be chosen for instance as at least one of the following: a specific period of time since the latest treatment of the particulate filter, a specific driving mileage of a vehicle with the particulate filter, frequency of regeneration in a specific period of time of the particulate filter, horsepower of a vehicle with the particulate filter, warning from an indicator light, a specific backpressure of the particulate filter.

In the system, a control means is advantageously included for stopping the cleaning unit when it is determined that the step of removing particulates from the particulate filter is completed. For instance, in the process of purging the filter, the cleaning unit is stopped when no particulate is observed with naked eyes to blow out of the filter. Or, in the process of purging the filter, the cleaning unit is stopped when no particulate is collected in the collection bag anymore. Or, the cleaning unit is stopped when the weight of the collection bag increases less than a threshold, for instance 0.1-1 g, in a particular period of time. Or, the cleaning unit is stopped when the back pressure of the whole the filter part or a portion of the filter increases less than a threshold, for example, 0.1 mbar-1 mbar, in a particular period of time. Or, the cleaning unit is stopped after completing a set of standard procedures, such as first loosening treatment and then gas flow treatment.

The above invention comes from a surprising finding in the inventor's treatment of used particulate filters. As a routine in the art, a diesel particulate filter is treated after operation to remove the particulate matters accumulated in the channels of the filter so as to alleviate the adversely high backpressure in the engine system. Since it often happens that particulate number (PN) filtration efficiency decreases after the treatment of removing particulate matters, the particulate filter may not pass the increasingly stringent standards of particulate number (PN) emission. After many methods have been tried by the inventors to avoid this defect, it was accidently found that a DPF, which was removed of the particulates and further introduced simulated ash in its inlet channels, showed better PN removal efficiency than a DPF treated only with ash-cleaning or a new DPF without any treatment, or a new DPF with simulated ash loading.

Based on the above finding, yet another aspect is disclosed for a method for producing a particulate filter, comprising: providing the particulate filter comprising a honeycomb structure; introducing simulated ash into inlet channels of the honeycomb structure until the particulate filter satisfies a treatment criterion; removing at least part of the simulated ash and/or particulates from the inlet channels of the honeycomb structure; and introducing simulated ash again into the inlet channels of the honeycomb structure.

In the above method, the treatment criterion can be chosen for instance as at least one of the following: a specific frequency of regeneration in a specific period of time of the particulate filter, a specific horsepower of a vehicle with the particulate filter, warning from an indicator light, a specific backpressure of the particulate filter.

In the above method, the particulate filter is treated by introducing simulated ash to represent some symptom of a used particulate filter before removing the particulates and once again introducing simulated ash. For instance, the filter may be treated with a specific loading of simulated ash, such as from about 0.1 g/L to 100 g/L, and preferably from about 0.5 g/L to about 50 g/L, and more preferably from about 1 g/L to about 10 g/L. Advantageously, the filter may be treated until showing a specific backpressure of the particulate filter, such as from about 0.1 Mbar to about 100 Mbar, and preferably from about 1 Mbar to about 50 Mbar, and more preferably from about 5 Mbar to 25 Mbar, given the backpressure is measure at flow rate 1020 m³/hr (CMH). Alternatively, the filter may be treated until showing a specific filtration efficiency of particulate matters or particulate number, such as equal to or greater than 80%, and preferably equal to or greater than 85%, and more preferably equal to or greater than 90%, and more preferably equal to or greater than 95%.

In a further aspect, there is disclosed a system for producing a particulate filter by using the method as disclosed above. That is, each of the features of the yet another aspect may be freely combined with this further aspect which further comprises: an introducing unit configured to provide simulated ash and/or particulates on surfaces of inlet channels of a honeycomb structure to be used in the particulate filter; and a cleaning unit with a gas and/or a liquid flow applicator configured to remove the simulated ash and/or particulates from the inlet channels of the honeycomb structure.

Each aspect defined in this disclosure may be combined with any other aspect or aspects unless clearly indicated to the contrary. In particular, any feature indicated as being preferred or advantageous may be combined with any other feature or features indicated as being preferred or advantageous unless clearly indicated to the contrary.

BRIEF DESCRIPTION OF THE DRAWINGS

Description will now be made with reference to the following non-limiting drawings and figures, in which.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

With respect to the terms used in this disclosure, the following definitions are provided.

Throughout the description, including the claims, the term "comprising one" or "comprising a" should be understood as being synonymous with the term "comprising at least one", unless otherwise specified, and "between" should be understood as being inclusive of the limits.

The terms "a", "an" and "the" are used to refer to one or to more than one (i.e., to at least one) of the grammatical object of the article.

The term "and/or" includes the meanings "and", "or" and also all the other possible combinations of the elements connected to this term.

All percentages and ratios are mentioned by weight unless otherwise indicated.

As used herein, the terms "catalyst" or "catalyst material" or "catalytic material" refer to a material or mixture of materials that promotes a reaction.

As is known in the art, a particulate filter can be used to remove particulate, particle or particulate matter from exhausts which may be generated by any sources including, for instance, an internal combustion engine, such as lean-burn engines, diesel engines, natural gas engines, gasoline engines, power plants, incinerators, etc.

Figure 1:
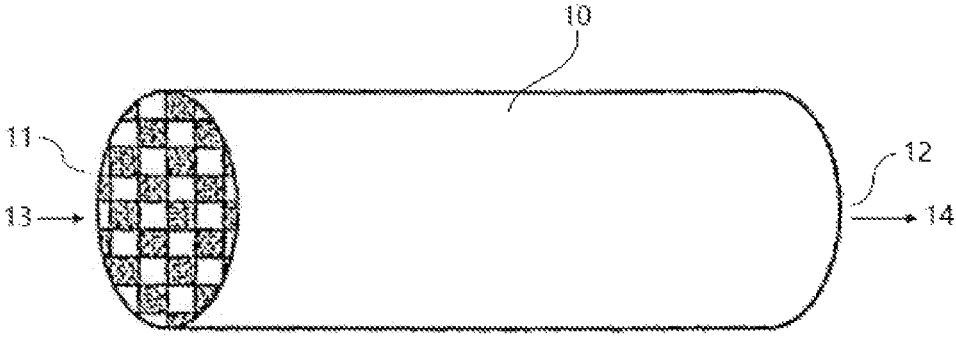
FIG. 1 is a perspective view of an illustrative particulate filter.

FIG. 1 shows a monolith of a filter in the form of a conventional honeycomb wall flow filter. In actual processes of production or operation, the filter usually further includes a housing for protecting and holding the monolith. The filter illustrated in the figure has a first end and a second end defining a longitudinal direction therebetween. In use, one of the two ends, for instance, the first end 11, will be configured as the inlet end for exhaust gases 13 and the other second end 12 as the outlet end for the treated gases 14.

Figure 2:
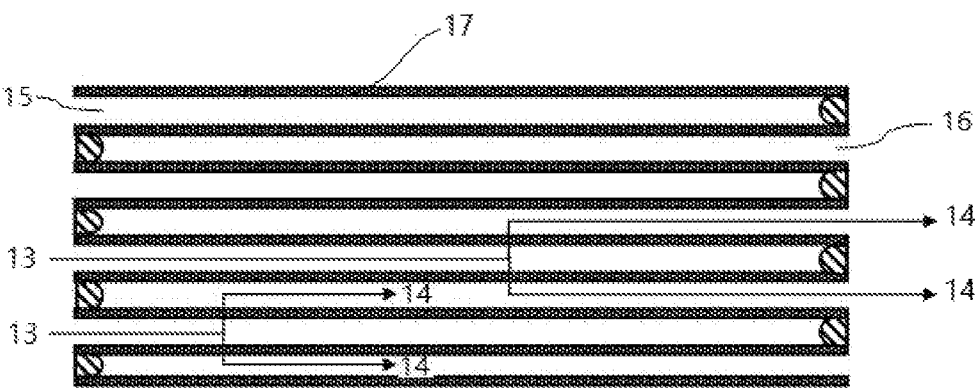
FIG. 2 is a cross-sectional view of the particulate filter of FIG. 1.

Further referring to FIG. 2, the filter has a plurality of channels defined by walls 17 extending in the longitudinal direction. The first set of channels referred to herein as inlet channels 15 is open at the first end 11 and closed with for instance sealant material at the second end 12.

The second set of channels referred to here as outlet channels 16 is open at the second end and closed also with sealant material at the first end 11. This construction results in a checkerboard-type pattern on either end of the monolith and permits the exhaust gas 13 with the entrained particulate matter to enter the inlet channels 15, flow through the porous walls into the outlet channels 16 as treated gases 14. Exhaust gas 13 entering the inlet channels 15 from the first end 11 cannot leave the monolith 10 without diffusing through the channel walls 17. The particulate matter is thereby filtered from the exhaust gas and accumulated on the internal surfaces of the inlet channels 15.

Preferably, within a plane orthogonal to the longitudinal direction, the filter has from 100 to channels per square inch, preferably from 200 to 400. The channels can have cross sections that are rectangular, square, circular, oval, triangular, hexagonal, or other polygonal shapes; or the channels may have other suitable geometrical shape for the application.

In one or more embodiments, the number of inlet channels 15 is equal to the number of outlet channels 16, and each channel is configured with the same form and size, and all of the channels are evenly distributed throughout the monolith.

In alternative embodiments, the number of inlet channels 15 is different from the number of outlet channels 16, and each channel can be configured with different and/or same form and size, and at least part of the channels is non-evenly distributed throughout the monolith.

The filter can be formed of any material as known in the art. For instance, the filter is ceramic wall flow filters, as described below, since it can remove substantial amount of the particulate material from diesel exhaust. The filter is advantageously composed of refractory materials such as cordierite or silicon-carbide or aluminum titanate.

In one or more embodiments, the channels of the filter may be coated with a functional material layer or catalyst composition. The functional material layer may be coated on the inner surface of the inlet channel 15 of the porous walls of the filter, the inner surface of the outlet channel 16, or both.

For the avoidance of any doubt, whilst ceramic wall flow filters are used in the present specification to illustrate the invention, although ceramic wall flow filters are preferred, such illustration is non-limiting and the present invention is not restricted to ceramic wall flow filters as such.

Catalyst compositions deposited along the internal surfaces of the channels assist in the regeneration of the filter by promoting the combustion of the accumulated particulate matter. The combustion of the accumulated particulate matters restores acceptable back pressures within exhaust systems. These processes may be either passive or active regeneration processes. Both processes utilize an oxidant such as $O_2$ or $NO_2$ to combust the particulate matters.

In one or more embodiments, the filter is coated with a catalyst to promote NOx conversion.

In one or more embodiments, the filter is coated with a catalyst to have at least one function of CO oxidation, hydrocarbon storage, hydrocarbon oxidation, NOx storage, NO oxidation, and fuel light-off.

In one or more embodiments, the catalyst composition is located in the walls and/or on the walls of the filter.

In one or more embodiments, at least about 5% by volume of the catalyst composition is located within the walls of the filter, preferably at least about 10% by volume of the catalyst composition is located within the walls of the filter, more preferably, at least about 20% by volume of the catalyst composition is located within the walls of the filter.

In one or more embodiments, the filter is coated on the inner surface of the inlet channels of the monolith. In other embodiments, the filter is coated in the outlet channels of the monolith. In still other embodiments, the filter is coated with at least a catalyst composition from both the inlet channels and the outlet channels of the monolith.

In one or more embodiments, the catalyst composition comprises such as platinum, palladium, ruthenium, rhodium, osmium, iridium, and/or gold (Pt, Pd, Ru, Rh, Os, Ir, and/or Au). Other catalytic components effective for promoting the combustion of soot include vanadium, tungsten, silver, rhenium, ceria, iron, manganese, nickel, copper (V, W, Ag, Re, Ce, Fe, Mn, Ni, Cu) and combinations thereof. These catalytic components can be used alone or on support materials.

In one or more embodiments, the filter comprises a porous wall having a mean pore diameter and a catalyst coating having a mean particulate size, wherein the ratio of the filter mean pore diameter to the catalyst mean particulate size distribution is in the range of 0.5 to 50, and/or the ratio of the filter mean pore diameter to the catalyst mean particulate size distribution is in the range of 0.25 to 30.

In addition to the use of oxidation catalysts, diesel particulate filters are used to achieve high particulate matter reduction in diesel emissions treatment systems. Known filter structures that remove particulate matter from diesel exhaust include honeycomb wall flow filters, wound or packed fiber filters, open cell foams, sintered metal filters, etc. However, ceramic wall flow filters, described below, receive the most attention. These filters can remove over 90% of the particulate material from diesel exhaust.

Typical ceramic wall flow filter substrates are composed of refractory materials such as cordierite or silicon-carbide. Wall flow substrates are particularly useful to filter particulate matter from diesel engine exhaust gases. A common construction is a multi-passage honeycomb structure having the ends of alternate passages on the inlet and outlet sides of the honeycomb structure plugged. This construction results in a checkerboard-type pattern on either end. Passages plugged on the inlet axial end are open on the outlet axial end. This permits the exhaust gas with the entrained particulate matter to enter the open inlet passages, flow through the porous internal walls and exit through the channels having open outlet axial ends. The particulate matter is thereby filtered on to the internal walls of the substrate. The gas pressure forces the exhaust gas through the porous structural walls into the channels closed at the upstream axial end and open at the downstream axial end. The filter is a physical structure for removing particulates from exhaust. The accumulating particulates will increase the back pressure from the filter on the engine. Thus, the accumulating particles have to be continuously or periodically burned out of the filter to maintain an acceptable back pressure. Unfortunately, the carbon soot particulates require temperatures in excess of 500° C. to burn under oxygen rich (lean) exhaust conditions. This temperature is higher than what is typically present in diesel exhaust.

Catalyst compositions deposited along the internal walls of the wall flow substrate assist in the regeneration of the filter substrates by promoting the combustion of the accumulated particulate matter. The combustion of the accumulated particulate matter restores acceptable back pressures within the exhaust system. These processes may be either passive or active regeneration processes. Both processes utilize an oxidant such as $O_2$ or $NO_2$ to combust the particulate matter.

Passive regeneration processes combust the particulate matter at temperatures within the normal operating range of the diesel exhaust system. Preferably, the oxidant used in the regeneration process is $NO_2$ since the soot fraction combusts at much lower temperatures than those needed when $O_2$ serves as the oxidant. While $O_2$ is readily available from the atmosphere, $NO_2$ can be actively generated using upstream oxidation catalysts that oxidize NO in the exhaust stream.

In spite of the presence of the catalyst compositions and provisions for using $NO_2$ as the oxidant, active regeneration processes are generally needed to clear out the accumulated particulate matter, and restore acceptable back pressures within the filter. The soot fraction of the particulate matter generally requires temperatures in excess of 500° C. to burn under oxygen rich (lean) conditions, which are higher temperatures than those typically present in diesel exhaust. Active regeneration processes are normally initiated by altering the engine management to raise temperatures in front of the filter up to about 550° C. to about 850° C. Depending on driving mode, high exotherms can occur inside the filter when the cooling during regeneration is not sufficient (low speed/low load or idle driving mode). Such exotherms may exceed 850° C. or more within the filter.

In one or more embodiments, the soot filter is coated with a catalyst to promote soot combustion and thereby to promote filter regeneration. In one or more embodiments, the soot filter is coated with a catalyst to promote NOx conversion. In one or more embodiments, the soot filter is coated with a catalyst to have at least one function of CO oxidation, hydrocarbon storage, hydrocarbon oxidation, NOx storage, NO oxidation, and fuel light-off.

In one or more embodiments, a catalyzed soot filter (CSF) is disposed downstream of the diesel oxidation catalyst.

In one or more embodiments, the catalyzed soot filter has a plurality of longitudinally extending passages bounded by longitudinally extending walls. In specific embodiments, the inlet passages have an open inlet end and a closed outlet end, and the outlet passages have a closed inlet end and an open outlet end. In one or more embodiments, the soot filter comprises a wall flow monolith with a wall porosity of about 40% to about 70%. In one or more embodiments, the soot filter comprises a wall flow monolith with an average pore diameter of about 5 microns to about 30 microns.

In one or more embodiments, the catalyzed soot filter comprises at least a catalyst composition in or on the walls of the soot filter. In one or more embodiments, the catalytic composition can be, for example, coated as a catalytic washcoat in or on the walls of the soot filter.

In one or more embodiments, the soot filter is coated with at least a catalyst that permeates the walls of a wall flow monolith. In other embodiments, the soot filter is coated with at least a catalyst on the walls of a wall flow monolith. In still other embodiments, the soot filter is coated with at least a catalyst both on the walls and permeates the walls of a wall flow monolith.

In one or more embodiments, the soot filter is coated from the inlet passages of the wall flow monolith. In other embodiments, the soot filter is coated from the outlet passages of the wall flow monolith. In still other embodiments, the soot filter is coated with at least a catalyst composition from both the inlet passages and the outlet passages of the wall flow monolith.

In one or more embodiments, the catalyzed soot filter comprises one or more catalytic materials. Catalytic materials may be present in or on the inlet side of the wall alone, in or on the outlet side alone, both the inlet and outlet sides, or the wall itself may consist all, or in part, of the catalytic material.

In one or more embodiments, the catalyzed soot filter includes the use of one or more layers of catalytic materials and combinations of one or more layers of catalytic materials in or on the inlet and/or outlet walls.

In one or more embodiments, the catalyzed soot filter is effective in combusting the particulate matter with nitrogen dioxide, and is effective to optimize the ratio of NO to $NO_2$ exiting the filter.

In one or more embodiments, the CSF composition comprises at least a PGM, such as platinum, palladium, ruthenium, rhodium, osmium, iridium, and/or gold (Pt, Pd, Ru, Rh, Os, Ir, and/or Au). Other catalytic components effective for promoting the combustion of soot include vanadium, tungsten, silver, rhenium, ceria, iron, manganese, nickel, copper (V, W, Ag, Re, Ce, Fe, Mn, Ni, Cu) and combinations thereof. These catalytic components can be used alone or on support materials. In particular embodiments, the CSF composition disclosed herein comprises total PGM loading from about 0.5 g/ft³ to about 250 g/ft³, calculated as the total weight of PGM element over the volume of the CSF catalyst; or the CSF composition disclosed herein comprises total PGM loading from about 0.01 wt. % to about 10 wt. %, based on the weight of the dry CSF composition.

In specific embodiments, the CSF composition disclosed herein comprises a platinum (Pt) component without palladium (Pd). In other specific embodiments, the CSF composition disclosed herein comprises a palladium (Pd) component without platinum (Pt). In still other specific embodiments, the CSF composition disclosed herein comprises both a platinum component and a palladium component.

In one or more embodiments, the CSF composition may comprise, for example, a platinum component from about 0.002 wt. % to about 8 wt. %, based on the weight of the dry CSF composition. The CSF composition may comprise, for example, a platinum component from about 0.1 to about 167 g/ft³, based on the volume of the CSF catalyst. The CSF composition may comprise, for example, a palladium component from about 0.002 wt. % to about 8 wt. %, based on the weight of the dry CSF composition. The CSF composition may comprise, for example, a palladium component from about 0.1 to about 167 g/ft³, based on the volume of the CSF catalyst.

In one or more embodiments, the Pt/Pd weight ratio is from about 20:1 to about 1:20. In some embodiments, the Pt/Pd weight ratio is from about 10:1 to about 1:5. In some embodiments, the Pt/Pd weight ratio is from about 3:1 to about 1:3.

In one or more embodiments, both the platinum and palladium components of the disclosed CSF composition are supported on a support material (wherein the support material on which the platinum component and the palladium component are supported can be the same or different).

In one or more specific embodiments, metal oxide supports useful in the CSF compositions disclosed herein are doped alumina materials, such as Si-doped alumina materials (including, but not limited to 1-10% $SiO_2$—$Al_2O_3$), doped titania materials, such as Si-doped titania materials (including, but not limited to 1-15% $SiO_2$—$TiO_2$) or doped zirconia materials, such as Si-doped $ZrO_2$ (including, but not limited to 5-30% $SiO_2$—$ZrO_2$), high surface area metal oxide supports, such as alumina or titania support materials, typically exhibit a total surface area (BET) of about 50 m²/g to about 400 m²/g, preferably from about 60 m²/g to about 350 m²/g, more preferably from about 90 m²/g to about 250 m²/g. In one or more specific embodiments, the support material has total pore volume (BET) in the range of about 0.3 to about 1.5 cm³/g. In one or more specific embodiments, the active alumina has mean pore diameter (BET) in the range of about 2 to about 50 nm.

In one or more embodiments, the CSF catalyst composition may comprise a hydrocarbon storage or hydrocarbon adsorption component. For example, the bottom layer or the top layer of a CSF catalyst further comprises a hydrocarbon storage or hydrocarbon adsorption component selected from a molecular sieve or a zeolite, or ceria-containing molecular sieve, or ceria-containing metal oxides. The hydrocarbon storage or hydrocarbon adsorption component can be added as H+ form. The hydrocarbon storage or hydrocarbon adsorption component may further comprise one or more catalytically active metals selected from PGM (such as platinum, palladium, rhodium, etc.), copper, iron, cerium, zirconium, barium, manganese, magnesium, cobalt, nickel, rear earth metal oxide, base metal oxide, etc.

In one or more embodiments, the catalyzed soot filter containing a catalyst that promotes SCR reaction is effective in two functions: removal of the particulate component of the exhaust stream and conversion of the NOx component of the exhaust stream to $N_2$. In specific embodiments, the catalyzed soot filter that can achieve NOx reduction is deposited with SCR catalyst composition.

An additional aspect for consideration in catalyzed soot filter is the selection of the appropriate SCR catalyst composition. First, the catalyst composition must be thermally durable so that it maintains its SCR catalytic activity even after prolonged exposure to higher temperatures that are characteristic of filter regeneration. Second, the SCR catalyst compositions preferably have a wide enough operating temperature range so that they can accommodate the variable temperature ranges over which the vehicle operates. Temperatures below 300° C. are typically encountered, for example, at conditions of low load, or at startup. The catalyzed soot filter should have a high specific activity combined with a high hydrothermally stability.

In one or more embodiments, the catalyzed soot filter comprising a catalyst that promotes SCR reaction is effective in two functions: removal of the particulate component of the exhaust stream and conversion of the NOx component of the exhaust stream to $N_2$. In specific embodiments, the catalyzed soot filter that can achieve NOx reduction is deposited with SCR catalyst composition.

In one or more embodiments, conversion of NOx passing through the CSF is in the range of about 10% to about 100% of the system NOx conversion, preferably in the range of about 20% to about 100%, more preferably in the range of about 25% to about 100%, under engine operating conditions.

In one or more embodiments, the CSF comprises at least a zeolite component and base metal component selected from one or both of a copper and iron.

In some preferred embodiments, the SCR catalyst composition comprises from 95 to 100 weight %, preferably from 98 to 100 weight %, more preferably from 99 to 100 weight % of the framework structure of the zeolitic material consist of Si, Al, O, and optionally H, wherein in the framework structure, the molar ratio of Si to Al, calculated as molar $SiO_2:Al_2O_3$, is preferably in the range of from 2:1 to 50:1, more preferably in the range of from 2:1 to 45:1, more preferably in the range of from 10:1 to 19:1, more preferably in the range of from 14:1 to 18:1.

In specific embodiments, the CSF comprises Cu and a zeolite with framework type preferably selected from, but not limited to, CHA, AEI, BEA, MFI, FAU, MOR, AFX and LTA. In one specific embodiment, the CSF comprises Cu and a zeolite having a CHA structure. In the other one specific embodiment, the CSF comprises Cu and a zeolite having an AEI structure.

In other specific embodiments, the CSF comprises Fe and a zeolite with framework type preferably selected from, but not limited to, CHA, AEI, BEA, MFI, FAU, MOR, AFX and LTA. In one specific embodiment, the CSF comprises Fe and a zeolite having a BEA structure. In the other one specific embodiment, the CSF comprises Fe and a zeolite having a CHA structure.

Zeolite compositions that may be used in accordance with one or more specific embodiments of the CSF include zeolites having a CHA or AEI structure. Exemplary CHA or AEI zeolites have a silica to alumina molar ratio (SAR) greater than about 8. In a preferred embodiment, silica to alumina molar ratio (SAR) for CHA is from about 10 to about 35. In another preferred embodiment, silica to alumina molar ratio (SAR) for AEI is from about 14 to 19.

In one or more specific embodiments, the base metal component selected from copper and iron has a content exceeding about 0.2 wt %, calculated as oxides of the metal and based on the total weight of the oxides plus the zeolite based catalyst composition. In preferred specific embodiments, the base metal component has a content from about 0.2 wt % to about 8 wt %, preferably from about 2 wt % to about 6 wt %.

Other useful compositions for CSF include nonzeolitic molecular sieves. For example, silicoalumi-nophosphates such as, but not limited to, SAPO-34, SAPO-44 and SAPO-18 may be used in accordance with one or more embodiments.

In one or more embodiments, the CSF comprises at least one inorganic metal oxide material selected from vanadium oxide and molybdenum oxide. In other embodiments, the CSF comprises a mixed oxide of vanadium oxide and titanium oxide. In certain other embodiments, the CSF comprises a mixed oxide of vanadium oxide, silicon oxide and titanium oxide. In certain other embodiments, the CSF comprises a mixed oxide of vanadium oxide, tungsten oxide and titanium oxide. In certain other embodiments, the CSF comprises a mixed oxide of vanadium oxide, antimony oxide and titanium oxide.

In one or more embodiments, the CSF catalyst composition has particulate size distribution $D_{50}$ from about 1 micron to about 10 microns. In one or more embodiments, the CSF catalyst composition has particulate size distribution Doo from about 2 microns to about 30 microns.

In one or more embodiments, the CSF catalyst composition has a total surface area (BET) in the range of about 50 to about 700 $m^2/g$. In one or more embodiments, the CSF catalyst composition has total pore volume (BET) in the range of about 0.3 to about 1.5 $cm^3/g$. In one or more embodiments, the CSF catalyst composition has mean pore diameter (BET) in the range of about 2 to about 50 nm.

In one or more embodiments, the CSF comprises a porous filter wall having a mean pore diameter; and a catalyst coating having a mean particulate size; wherein the ratio of the filter mean pore diameter to the catalyst mean particulate size distribution $D_{50}$ is in the range of 0.5 to 50 microns, and/or the ratio of the filter mean pore diameter to the catalyst mean particulate size distribution $D_{90}$ is in the range of 0.25 to 30 microns.

"$D_{90}$" and "$D_{50}$" have their usual meaning of referring to the point where the cumulative volume from the small-particle-diameter side reaches 90% and 50% in the cumulative particle size distribution. $D_{90}$ is the value determined by measuring the particle size distribution, respectively. The particle size distribution is measured by using laser diffraction particle size distribution analyzer.

In one or more embodiments, the CSF is coated with at least a catalyst with a washcoat loading (dry gain) from about 0.05 to about 3.0 $g/in^3$, preferably from about 0.1 to about 2.5 $g/in^3$.

The method and system for treating a used particulate filter according to one of the embodiments of the invention will now be described with reference to FIGS. 3-6.

According to one embodiment, the method is useful for treating used filters, that is, filters which have been used so much in performing their filtering function as to satisfy specific treatment criteria. The treatment criterion can be chosen for instance as at least one of the following: a specific period of time since the latest treatment of the particulate filter, a specific driving mileage of a vehicle with the particulate filter, frequency of regeneration in a specific period of time of the particulate filter, horsepower of a vehicle with the particulate filter, warning from an indicator light, a specific backpressure of the particulate filter.

Where the filter is evaluated as not satisfying any of the criteria, no treatment is necessary. On the other hand, if the filter is evaluated as satisfying at least one of the treatment criteria, a next step of removing particulates accumulated in the particulate filter will be carried out.

Currently different filter cleaning methods are established, such as pressurized air-based cleaning procedures and washing-based procedures. The cleaning procedures can be in combination with heat treatment.

Pressurized air-based cleaning procedures typically involve pressurized air and optionally air with $CO_2$, about 20 min to about 30 min cleaning time, about 3 bar to about 8 bar pressure, 0%-8% $CO_2$.

Reverse flow pneumatic cleaning is currently the most prevalent method of ash cleaning and removal from diesel particulate filters. While several variations of the process exist, the basic cleaning method involves driving a flow through the filter from the outlet side (reverse flow) and collecting the ash blown out of the filter in a suitable dust collection system. Various commercial cleaning systems exist, which utilize either the localized application of high-pressure air, such as an air knife, or low pressure but high-volume flow through the entire filter cross-section. Prior to pneumatic cleaning, the filter may also be placed in a furnace and heated in order to oxidize any residual soot.

Additional, and somewhat less common, cleaning methods include wet cleaning, in which water or some other cleaning agent is flushed through the filter to remove the ash. Wet cleaning is generally performed at factory remanufacturing centers and requires suitably designed filter substrates, matting, and housings which are compatible with the cleaning liquid.

Other advanced cleaning techniques have also been proposed, but either have yet to enter the market, or are not mainstream.

Figure 3:
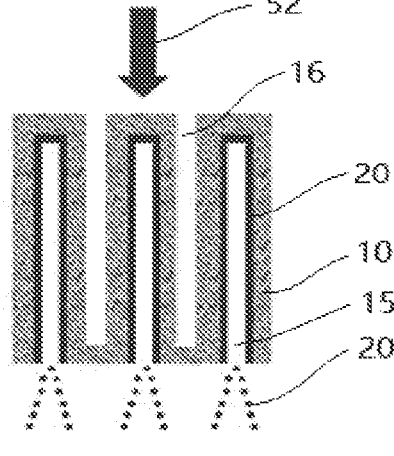
FIG. 3 illustrates a step of removing particulates accumulated in the channels of the particulate filter.

FIG. 3 shows a schematic diagram of an illustrative step for removing particulates accumulated in the channels of the particulate filter. As shown, the filter 10 is positioned so that a gas flow 52 blows into the outlet channels 16 on the outlet end and the particulate matter 20 accumulated in the inlet channels 15 are blown out of the outlet end.

In one example, the gas flow is provided with a pressure of about 1-15 bar and/or with a flow rate of about 100-10000 L/min.

Advantageously, before the gas flow is blown into the outlet channels, the step further includes applying a gas flow on the inlet end of the particulate filter to loosen the particulates in the inner surface of the particulate filter. Other measures known in the art for loosening the particulates accumulated in the channels can be used alternatively or in combination. After loosening the particulates, a gas flow is applied on the outlet end of the particulate filter to remove the particulates out of the particulate filter. It can be appreciated that the step of loosening the particulates can be omitted.

Advantageously, the step of removing the particulates further includes exposing the particulate filter to a temperature up to about 450° C. to 850° C. This step is aimed to burn the soot fraction of the particulate matter under rich oxygen conditions, which has higher temperature than those typically present in diesel exhaust. This process is known in the art as active regeneration processes normally initiated by altering the engine management to raise temperatures in front of the filter up to about 550° C. to about 650° C. Depending on driving mode, high exotherms can occur inside the filter when the engine is not cooled sufficiently (such as in low speed, low load or idle driving mode). Such exotherms may exceed 800° C. or more within the filter.

Figure 5:
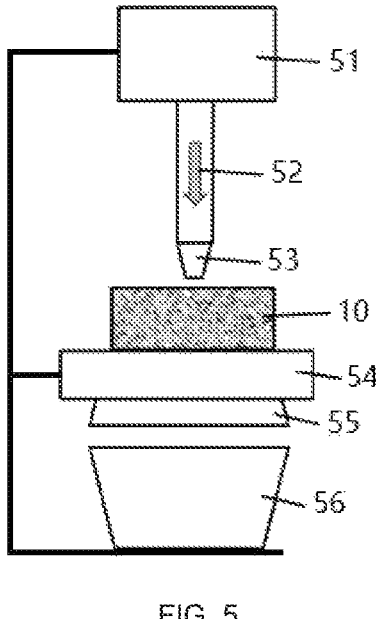
FIG. 5 shows a schematic diagram of an illustrative cleaning unit with a gas flow applicator for removing particulates accumulated in the channels of the particulate filter.

The step of removing particulates accumulated in the channels of the particulate filter can be carried out for instance with PURItech ash cleaner, PURIcleaning M/C E1. The principle of one of the embodiments of the cleaning unit is illustrated in FIG. 5. The cleaning unit includes a gas flow applicator 51 that provides the gas flow 52. Optionally, an ejector 53 is configured as extending from the applicator 51 to eject gas flow 52. The ejector 53 has a configuration covering the end of the filter or is configured to move along the whole area of the end of the filter so as to apply gas flow into each of the channels. A holder 54 is provided to fix the particulate filter in the cleaning unit in the process of cleaning. Optionally, there can be provided with an ash exit 55 and an ash collector 56 to collect the particulates exhausted from the particulate filter.

In carrying out the step of cleaning, the filter is inserted into the cleaning unit on the holder upside down (outlet end upward). The gas flow is applied from the ejector into and through the filter. In one embodiment, the ejector moves from channel(s) to channel(s), until the entire end area is covered. Then, reverse the filter with the inlet end upward and apply gas flow into the inlet channels of the filter. The cleaning steps may be repeated for several times, such as four times in total, containing two times of filter inlet end upward and two times of outlet end upward. The gas flow can be set as for instance 8 Bar in pressure and/or 1000 L/min in flow rate.

Advantageously, the cleaning unit comprises a control means which can for instance determine the cleanliness of the filter and stop the gas flow from blowing. For instance, in the process of purging the filter, the cleaning unit is stopped when no particulate is observed with naked eyes to blow out of the filter. Or, in the process of purging the filter, the cleaning unit is stopped when no particulate is collected in the collection bag anymore. Or, the cleaning unit is stopped when the weight of the collection bag increases less than a threshold, for instance 0.1-1 g, in a particular period of time. Or, the cleaning unit is stopped when the back pressure of the whole filter part or a portion of the filter increases less than a threshold, for example, 0% to 5% of the original back pressure, in a particular period of time. Or, the cleaning unit is stopped after completing a set of standard procedures, such as first particulate loosening treatment and then gas flow treatment.

Figure 4:
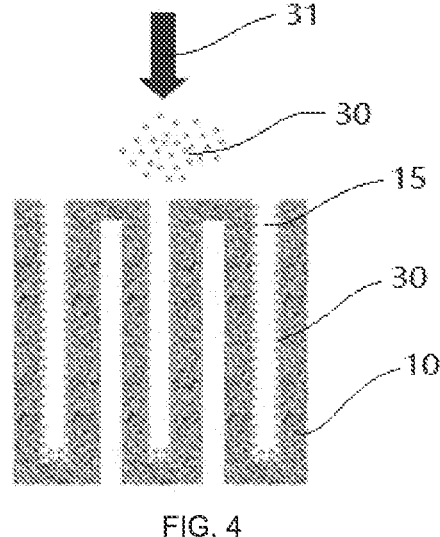
FIG. 4 illustrates a step of introducing simulated ash within the channels of the particulate filter after the steps for removing the particulates, or within the channels of a new particulate filter.

After the completion of the step of removing particulates accumulated in the particulate filter, the filter will be further treated with the step of providing simulated ash and/or precursor of the simulated ash into channels of the particulate filter. FIG. 4 shows a schematic diagram of an illustrative step of introducing simulated ash within the channels of the particulate filter. As shown, by applying gas flow 31, the simulated ash 30 and/or a precursor of the simulated ash is blown into the the the inlet channels 15 of the particulate filter 10.

In one embodiment, the step of introducing simulated ash includes further treating the particulate filter after introducing simulated ash into channels of the particulate filter. In one embodiment, such treatment comprises exposure of the particulate filter to a thermal condition, e.g. no less than 300° C., more preferably no less than 350° C., and most preferably no less than 400° C.

In one embodiment, the step of introducing simulated ash includes introducing a precursor into channels of the particulate filter and further treating the particulate filter to convert the precursor to the simulated ash. In one embodiment, such treatment comprises exposure of the particulate filter to a thermal condition, e.g. no less than 300° C., more preferably no less than 350° C., and most preferably no less than 400° C.

In one embodiment, the flow of solid particulates and/or liquid droplets is provided at 100-10000 $m^3$/h.

In one embodiment, the simulated ash is provided at no less than about 0.05 gram per liter of the volume of the particulate filter.

In one embodiment, the flow of solid particulates and/or liquid droplets is introduced into the particulate filter via blowing, sucking, spraying and/or coating.

In the method, the simulated ash and/or precursor preferably comprises one or more of the following: aluminum oxide, zinc oxide, zinc carbonate, calcium oxide, calcium carbonate, cerium zirconium oxide, zirconium oxide, cerium oxide and hydrated alumina, more preferably one or more of: zinc oxide, zinc carbonate, calcium oxide, calcium carbonate and zirconium oxide. Advantageously, the simulated ash has a porous structure that survives no less than 300° C. Advantageously, the simulated ash and/or its precursor preferably have a particulate size ranging from about 0.01 micron to about 1000 micron, and preferably from about 0.1 micron to about 100 microns, and most preferably from about 0.2 micron to about microns.

The step for providing simulated ash and/or precursor within the channels of the particulate filter can be carried out by an introducing unit, for instance as illustrated in FIG. 5. The principle of an introducing unit is shown FIG. 6. As shown, the cleaning unit includes a gas flow applicator 61 that provides the gas flow. The introducing unit further includes a simulated ash source 62 for providing simulated ash and/or precursor 30. The pipe of the gas flow applicator 61 and the pipe of the simulated ash source 62 are joined so as to form a flow of simulated ash/precursor 63 flowing out the ejector 64 with sufficient rate of flow. A holder 65 is provided in the introducing unit to hold the filter 10. The filter is held on the holder 65 with the inlet end opposite the ejector 64 so that the simulated ash can be blown into the inlet channels. Further, an exit 66 and an ash collector 67 are provided under the holder 65 to collect the possible particulate matters and simulated ash escaping from the outlet end of the filter.

Advantageously, the introducing unit further comprises a control means which can for instance determine the completion of introducing simulated ash into inlet channels of the particulate filter.

Figure 7:
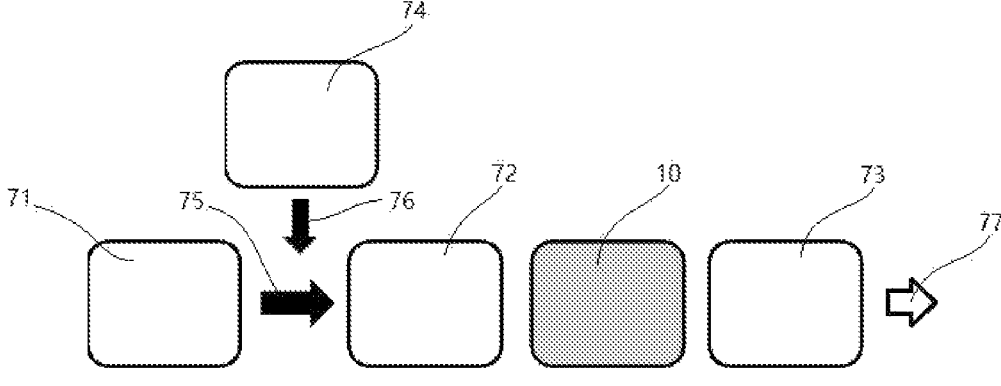
FIG. 7 shows a schematic diagram of an illustrative detection system for evaluating a particulate filter.
Figure 8:
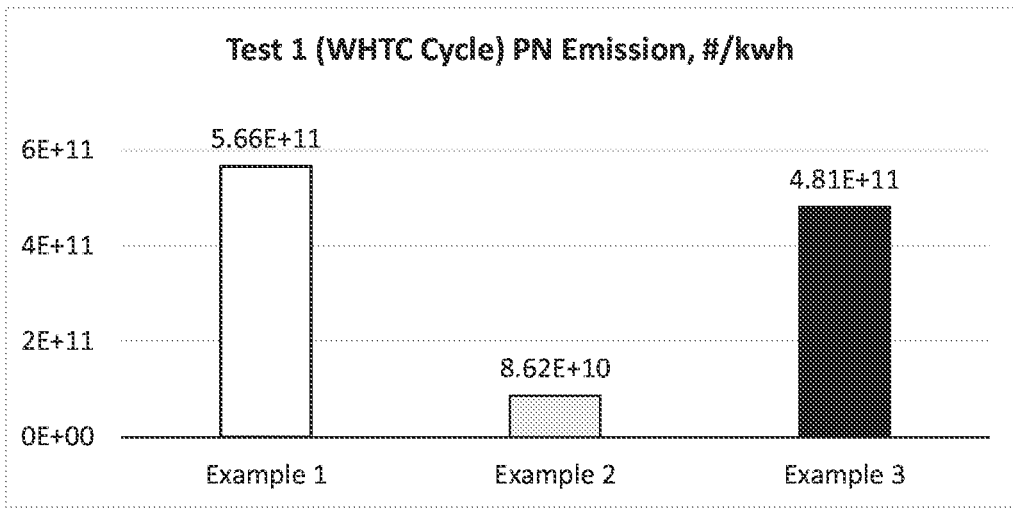
FIG. 8 is a plot showing comparative results in WHTC test cycles of filters.
Figure 9:
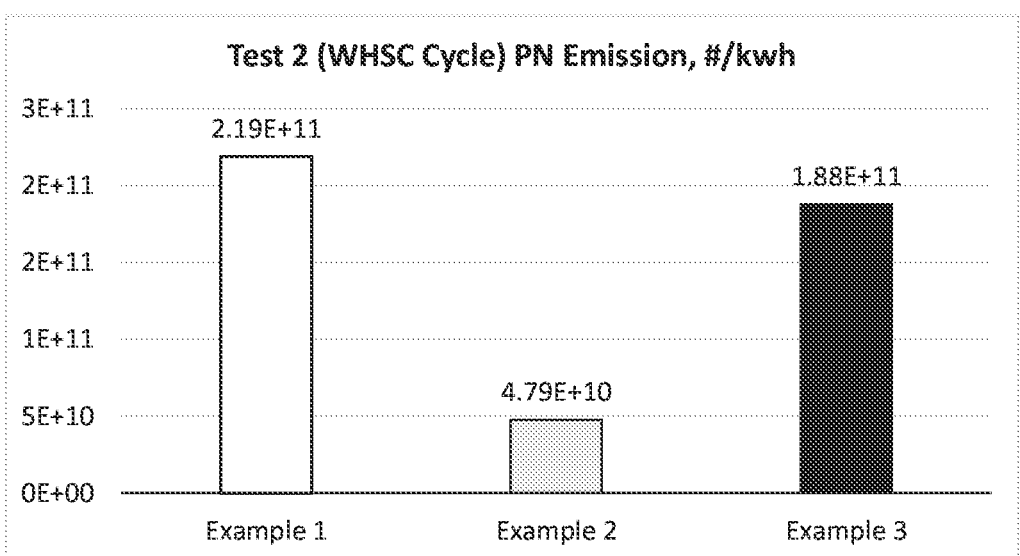
FIG. 9 is a plot showing comparative results in WHSC test cycles of filters.

Some of the advantages of the method and system in some of the embodiments according to the invention is illustrated by comparative experiments as shown in FIGS. 7-9.

In order to carry out the comparative experiments, a detection system was specially designed as FIG. 7. The system includes an engine 71, a Diesel Oxidation Catalyst (DOC) and a particulate matter counter (counter) 73. A filter 10 is positioned between the DOC and the counter for detection. In addition, a fuel spray injector 74 is installed before DOC 72 for injecting fuel 76 into the flow of exhaust 75 from the engine 71. In the system, the DOC is a commercial Diesel Oxidation Catalyst with dimensions of 12"×12"×6", with PGM loading of 50 g/ft³ 1:2 at front zone length of 2", 20 g/ft³, 10:1 at rear zone length of 4", and the particulate counter is AVL 489.

The detection system simulates the actual working environment to test filters in WHTC and WHSC cycles which are worldwide accepted for assessing performance of a diesel engine in several aspects including, among others, PN removal efficiency. The details of WHTC cycle and WHSC cycle are defined for instance in the Chinese national regulation GB17691-2018 (Limits and measurement methods for emissions from diesel fueled heavy-duty vehicles (China VI)). In order to make sure the impact of soot on the evaluation result is minimal, the detection system includes a fuel spray injector 74 before DOC 72 for injecting fuel 76 into the flow of exhaust 75 to clean the soot in the filter to be tested.

The invention is further illustrated by the following embodiments, which do not limit the scope of the invention but merely serve to illustrate some embodiments of the invention.

Embodiment 1. A method for treating a used particulate filter, comprising: removing particulates from the particulate filter; and introducing simulated ash into inlet channels of the particulate filter after removing the particulates.

Embodiment 2. The method of Embodiment 1, wherein the particulate filter is used to remove exhaust particulates generated by an internal combustion engine.

Embodiment 3. The method of any one of the preceding Embodiments, wherein the used particulate filter has at least one of the following: a specific period of time since the latest treatment of the particulate filter, a specific driving mileage of a vehicle with the particulate filter, a specific frequency of regeneration in a specific period of time of the particulate filter, a specific horsepower of a vehicle with the particulate filter, warning from an indicator light, a signal from a sensor, a specific backpressure of the particulate filter, a specific loading of particulate matters.

Embodiment 4. The method of any one of the preceding Embodiments, wherein the step of removing particulates includes applying a gas and/or a liquid flow at an outlet end and/or an inlet end of the particulate filter.

Embodiment 5. The method of Embodiment 4, wherein the step of removing particulates includes exposing the particulate filter to a temperature of up to about 450° C. to 850° C.

Embodiment 6. The method of Embodiments 4 or 5, wherein the gas flow is provided with a pressure of about 1-15 bar and/or with a flow rate of about 100-10000 L/min.

Embodiment 7. The method of any one of the preceding Embodiments, wherein the step of introducing simulated ash includes introducing a flow of solid particles and/or liquid droplets of the simulated ash and/or a precursor of the simulated ash through an inlet end of the particulate filter into channels of the particulate filter.

Embodiment 8. The method of any one of the preceding Embodiments, wherein the step of introducing simulated ash includes introducing simulated ash into channels of the particulate filter and, optionally, further thermally treating the particulate filter.

Embodiment 9. The method of any one of the preceding Embodiments, wherein the step of introducing simulated ash includes introducing a precursor into channels of the particulate filter and further treating the particulate filter to convert the precursor to simulated ash.

Embodiment 10. The method of Embodiment 7, wherein the flow of solid particles and/or liquid droplets is provided at 100-10000 m³/h.

Embodiment 11. The method of any one of Embodiments 7-10, wherein no less than about 0.05 gram of simulated ash is provided for per liter of the particulate filter.

Embodiment 12. The method of any one of Embodiments 7-11, wherein the flow of solid particles and/or liquid droplets is introduced into the particulate filter via blowing, sucking, spraying and/or coating.

Embodiment 13. The method of any one of Embodiments 7-12, wherein the simulated ash has a porous structure that can survive at a temperature of no less than 300° C.

Embodiment 14. The method of any one of Embodiments 7-13, wherein the simulated ash and/or its precursor have a particle size ranging from about 0.01 micron to about 1000 micron.

Embodiment 15. A system for treating a used particulate filter by the method according to any one of Embodiments 1-14, comprising: a cleaning unit with a gas and/or a liquid flow applicator configured to remove particulates accumulated in the particulate filter; and an introducing unit configured to provide simulated ash and/or precursor of the simulated ash into channels of the particulate filter after removing the particulates.

Embodiment 16. The system of Embodiment 15, further comprising a detection unit for evaluating the particulate filter with a treatment criterion.

Embodiment 17. The system of at least one of the preceding Embodiments, further comprising a controlling unit configured to stop the cleaning unit and/or the introducing unit when it is determined that the step of removing particulates from the particulate filter and/or the step of introducing simulated ash into inlet channels of the particulate filter is completed.

Embodiment 18. A method for manufacturing a particulate filter, comprising: providing a particulate filter having a honeycomb structure; introducing simulated ash into inlet channels of the honeycomb structure; removing at least part of the simulated ash and/or particulates from the inlet channels of the honeycomb structure; and introducing simulated ash again into the inlet channels of the honeycomb structure.

Embodiment 19. A system for manufacturing a particulate filter with the method according to Embodiment 18, comprising: an introducing unit configured to provide simulated ash and/or particulates on inner surfaces of inlet channels of a honeycomb structure to be used in the particulate filter; and a cleaning unit with a gas and/or a liquid flow applicator configured to remove the simulated ash and/or particulates from the inlet channels of the honeycomb structure.

Example 1

A commercial diesel particulate filter (DPF) was chosen with coating containing 3 g/ft$^3$ (Pt:Pd=1:0) PGM, coated on Ibiden SD084 SiC substrate. The size of DPF was 10.5"× 10.5"×7.5". The DPF was used in vehicle operation for 230,000 km and accumulated particulate matters of a substantial amount in its channels. Then, the DPF was soot-cleaned with the detecting system of FIG. 7 and followed by ash cleaning with the cleaning unit as shown in FIG. 5, then tested with the detecting system of FIG. 7. The abovementioned soot-cleaning process involved fuel injection via the fuel injector 74 before DOC 72. DOC 72 oxidized fuel to generate exotherm. The DPF at position 10 was maintained at >=600° C. both at DPF inlet and at DPF outlet for >=1 hour with space velocity (SV) of >=60,000/h. The abovementioned ash-cleaning process was carried out with the PURItech ash cleaner, PURIcleaning M/C E1. The abovementioned ash-cleaning process followed steps: 1) sample inspection, 2) thermal treatment in an oven (key parameters: >=500° C., up to 8 hours, oxygen-containing atmosphere), 3) gas flow cleaning (key parameters: outlet end upward with applied gas flow, then reverse the filter with inside end upward with applied gas flow, repeated for at least four times, blowing compressed air, pressure 8 Bar, flow rate 1000 L/min). The completion of the abovementioned ash-cleaning process was determined by no change in back pressure and by no change in the weight of the filter. The testing result in WHSC was recorded as Example 1 in FIG. 8 and the testing result in WHTC was recorded as Example 1 in FIG. 9.

Example 2

The DPF was further loaded with simulated ash with the introducing unit as illustrated in FIG. and then tested with the detecting system of FIG. 7. The testing result in WHSC was recorded as Example 2 in FIG. 8 and the testing result in WHTC was recorded as Example 2 in FIG. 9. In this step, the DPF was loaded with 1.25 g/L simulated ash. Air flow rate was set as 1000 m$^3$/h for at least 15 s.

Example 3

Figure 6:
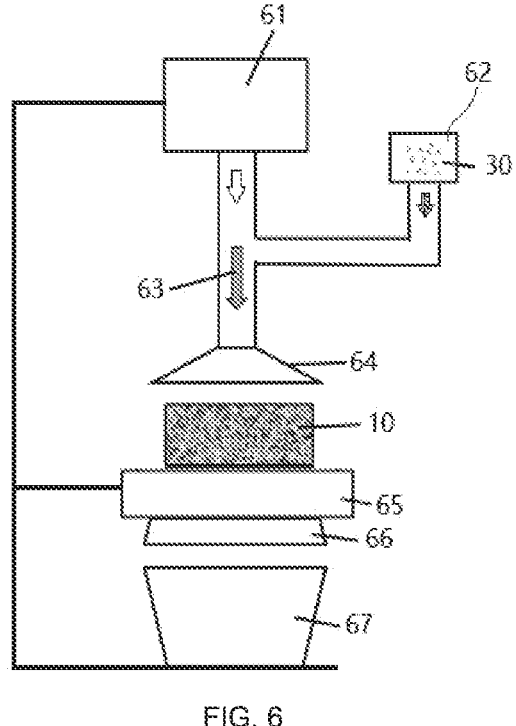
FIG. 6 shows a schematic diagram of an introducing unit with a simulated ash applicator for providing simulated ash within the channels of the particulate filter after the step of removing the particulates.

Choose a new commercial DPF which were not used in any engine. That is, the new filter accumulates no particulate matters in the channels. The new DPF was loaded with simulated ash with an introducing unit as illustrated in FIG. 6 and then tested with the detecting system of FIG. 7. The testing result in WHSC was recorded as Example 3 in FIG. 8 and the testing result in WHTC was recorded as Example 3 in FIG. 9.

As is shown in FIG. 8, Example 2, in which the filter was treated with the method according to this invention, has the lowest PN emission and the best PN removal efficiency among the three examples in WHSC cycles.

Meanwhile, FIG. 9 shows Example 2, in which the filter was treated with the method according to this invention method, has the lowest PN emission and the best PN removal efficiency among the three examples in WHTC cycles.

In conclusion, a used DPF which was treated by particulate removal and followed by a simulated ash loading process showed better PN removal efficiency than another used DPF treated only with ash-cleaning or a new DPF without any treatment or a new DPF with simulated ash loading.

Although preferred embodiments of the invention have been described herein in detail, it will be understood by those skilled in the art that variations may be made thereto without departing from the scope of the invention or of the appended claims. For the avoidance of doubt, the entire contents of all documents cited herein are incorporated herein by reference.

The invention claimed is:

1. A method for treating a used particulate filter, comprising:

removing particulates from the particulate filter; and introducing simulated ash into inlet channels of the particulate filter after removing the particulates, wherein the simulated ash comprises platinum group metals, the platinum group metal including ruthenium, rhodium, palladium, osmium, iridium, platinum, and/or gold;

wherein the filter is coated with at least a catalyst composition comprising platinum, palladium, ruthenium, rhodium, osmium, iridium, and/or gold; and wherein the step of removing particulates includes applying a gas and/or a liquid flow at an outlet end and/or an inlet end of the particulate filter, wherein the gas flow is provided with a pressure of about 2-15 bar and/or with a flow rate of about 100-10000 L/min.

2. The method of claim 1, wherein the particulate filter is used to remove exhaust particulates generated by an internal combustion engine.

3. The method of claim 1, wherein the used particulate filter has at least one of the following: a specific period of time since the latest treatment of the particulate filter, a specific driving mileage of a vehicle with the particulate filter, a specific frequency of regeneration in a specific period of time of the particulate filter, a specific horsepower of a vehicle with the particulate filter, warning from an indicator light, a signal from a sensor, a specific backpressure of the particulate filter, a specific loading of particulate matters.

4. The method of claim 1, wherein the step of removing particulates includes exposing the particulate filter to a temperature of up to about 450° C. to 850° C.

5. The method of claim 1, wherein the step of introducing simulated ash includes introducing a flow of solid particles and/or liquid droplets of the simulated ash and/or a precursor of the simulated ash through an inlet end of the particulate filter into channels of the particulate filter.

6. The method of claim 1, wherein the step of introducing simulated ash includes introducing simulated ash into channels of the particulate filter and, optionally, further thermally treating the particulate filter.

7. The method of claim 1, wherein the step of introducing simulated ash includes introducing a precursor into channels of the particulate filter and further treating the particulate filter to convert the precursor to simulated ash.

8. The method of claim 5, wherein the flow of solid particles and/or liquid droplets is provided at 100-10000 m³/h.

9. The method of claim 5, wherein no less than about 0.05 gram of simulated ash is provided for per liter of the particulate filter.

10. The method of claim 5, wherein the flow of solid particles and/or liquid droplets is introduced into the particulate filter via blowing, sucking, spraying and/or coating.

11. The method of claim 5, wherein the simulated ash has a porous structure that can survive at a temperature of no less than 300° C.

12. The method of claim 5, wherein the simulated ash and/or its precursor have a particle size ranging from about 0.01 micron to about 1000 micron.

13. A system for treating a used particulate filter by the method according claim 1, comprising:

a cleaning unit with a gas and/or a liquid flow applicator configured to remove particulates accumulated in the particulate filter; and an introducing unit configured to provide simulated ash and/or precursor of the simulated ash into channels of the particulate filter after removing the particulates.

14. A method for manufacturing a particulate filter, comprising:

providing a particulate filter having a honeycomb structure;

introducing simulated ash into inlet channels of the honeycomb structure;

removing at least part of the simulated ash and/or particulates from the inlet channels of the honeycomb structure; and introducing simulated ash again into the inlet channels of the honeycomb structure, wherein the simulated ash comprises platinum group metals, the platinum group metal including ruthenium, rhodium, palladium, osmium, iridium, platinum, and/or gold;

wherein the particulate filter is coated with at least a catalyst composition comprising platinum, palladium, ruthenium, rhodium, osmium, iridium, and/or gold; and wherein the step of removing particulates includes applying a gas and/or a liquid flow at an outlet end and/or an inlet end of the particulate filter, wherein the gas flow is provided with a pressure of about 2-15 bar and/or with a flow rate of about 100-10000 L/min.

15. A system for manufacturing a particulate filter with the method according to claim 14, comprising:

an introducing unit configured to provide simulated ash and/or particulates on inner surfaces of inlet channels of a honeycomb structure to be used in the particulate filter; and a cleaning unit with a gas and/or a liquid flow applicator configured to remove the simulated ash and/or particulates from the inlet channels of the honeycomb structure.

* * * * *